US010795388B2

(12) United States Patent
Chen et al.

(10) Patent No.: US 10,795,388 B2
(45) Date of Patent: Oct. 6, 2020

(54) VOLTAGE ADJUSTMENT DEVICE AND METHOD THEREOF

(71) Applicant: WIWYNN CORPORATION, New Taipei (TW)

(72) Inventors: Yi-Hao Chen, New Taipei (TW); Chia-Ming Tsai, New Taipei (TW)

(73) Assignee: WIWYNN CORPORATION, New Taipei (TW)

( * ) Notice: Subject to any disclaimer, the term of this patent is extended or adjusted under 35 U.S.C. 154(b) by 202 days.

(21) Appl. No.: 16/128,705

(22) Filed: Sep. 12, 2018

(65) Prior Publication Data

US 2019/0391607 A1  Dec. 26, 2019

(30) Foreign Application Priority Data

Jun. 22, 2018  (TW) .............................. 107121451 A

(51) Int. Cl.
   *G05F 1/46* (2006.01)
   *H02J 7/00* (2006.01)
   *H02J 7/34* (2006.01)

(52) U.S. Cl.
   CPC .............. *G05F 1/46* (2013.01); *H02J 7/0068* (2013.01); *H02J 7/345* (2013.01)

(58) Field of Classification Search
   CPC . G05F 1/46; H02J 7/00306; H02J 1/14; H02J 9/061; H02J 2207/50; H02J 7/345
   See application file for complete search history.

(56) References Cited

U.S. PATENT DOCUMENTS

2008/0290732 A1\* 11/2008 Hou .................. H02J 9/061
                                                      307/64
2018/0052506 A1\* 2/2018 Kuo .................. G06F 11/28

FOREIGN PATENT DOCUMENTS

TW          M392378 U       11/2010
TW          201807538 A      3/2018

OTHER PUBLICATIONS

TW Office Action in application No. 107121451 dated Oct. 31, 2019.

\* cited by examiner

*Primary Examiner* — Jared Fureman
*Assistant Examiner* — Duc M Pham
(74) *Attorney, Agent, or Firm* — Maschoff Brennan

(57) ABSTRACT

A voltage adjustment device comprises a voltage detector and a signal emitter. The voltage detector electrically connects to an electrical device through a power rail and obtains a voltage detected value of the power rail. The signal emitter electrically connects to the voltage detector and is configured to electrically connect to a host and a power board. The signal emitter generates a power good signal and sends the power good signal to the host when the voltage detected value is larger than a baseline voltage value for the first time. After sending the power good signal, the signal emitter generates a voltage adjustment signal according to the voltage detected value and is configured to send the voltage adjustment signal to the power board for selectively adjusting a voltage provided by the power board.

10 Claims, 7 Drawing Sheets

VOLTAGE ADJUSTMENT DEVICE AND METHOD THEREOF

CROSS-REFERENCE TO RELATED APPLICATIONS

This non-provisional application claims priority under 35 U.S.C. § 119(a) on Patent Application No(s). 107121451 filed in Taiwan on Jun. 22, 2018, the entire contents of which are hereby incorporated by reference.

TECHNICAL FIELD

This disclosure relates to a voltage adjustment device and method thereof, more particularly to the voltage adjustment device installed on the end of the power rail and method thereof.

RELATED ART

The scale of the rack server and the storage system in data centers gradually increases. Ensuring an accurate and stable power supply for various components in the system becomes an important issue.

The power board on the server or on the storage system converts the external power into different DC voltages and provides them to the system. The common converted voltage level is, for example, 12 volts, 5 volts, 3.3 volts, etc. The level of these voltages must fall within a certain standard range, otherwise, the chip may work abnormally.

In the design of large rack system, since the rack system is much larger than the general notebook computer or personal computer, as well as other factors such as the loss of wires, boards, or connectors, and a large amount of power-consuming hard disks and computing units, at the end of the power rail, that is, the trace far away from the power source, the voltage may be too low. Especially when the system loading is heavy, the degree of voltage drop is more obvious. If the voltage level is too low, the data may be lost or the transmission may be abnormal. The problem of an insufficient voltage at the end of the power rail will also cause limitation in the power rail design.

There are two common solutions to the problem of an excessively low voltage at the end of the power rail. One solution is "low voltage protection". When the voltage is less than a reference value, the device is turned off to achieve the effect of protection. However, if the device is suddenly closed without an appropriate buffering mechanism, it may result in the transmitting data loss. Another solution is to raise the source voltage to compensate for the voltage drop when the power board provides the power to the end of the power rail. However, if the voltage adjustment range is fixed, when the system load is not high (i.e., the voltage loss is small), the voltage of the front end (near the power source) may be too high, resulting in unnecessary energy waste.

In addition to the voltage level problem, about the power-up timing aspect in a large system, since there are multiple voltage converters or voltage regulators on the power rail, the preparation time to reach the desired voltage level at the end of the power rail is longer, this causes transient leakage or chip abnormality.

SUMMARY

According to an embodiment of this disclosure, a voltage adjustment device configured to electrically connect to a host, a power board, and an electrical device, wherein the host electrically connects to and controls the electrical device, and the power board electrically connects to the host and the electrical device to supply operation power required by the host and the electrical device, with the voltage adjustment device comprising: a voltage detector and a signal emitter. The voltage detector is configured to electrically connect to the electrical device through a power rail and obtain a voltage detected value of the power rail. The signal emitter electrically connects to the voltage detector and is configured to electrically connect to the host and the power board, wherein, when the voltage detected value is larger than a baseline voltage value for the first time, the signal emitter generates a power good signal and is configured to send the power good signal to the host, and, after sending the power good signal, the signal emitter generates a voltage adjustment signal according to the voltage detected value and is configured to send the voltage adjustment signal to the power board for selectively adjusting a voltage provided by the power board.

According to another embodiment of this disclosure, a voltage adjustment device further comprises a power supply device. The power supply device electrically connecting to the voltage detector, configured to electrically connect to the electrical device through the power rail, and configured to electrically connect to the power board, wherein the power supply device provides a supplementary power when the voltage detected value is less than or equal to the baseline voltage value. The power supply device comprises a super-capacitor set and a charging circuit. The supercapacitor set is configured to electrically connect to the electrical device through the power rail for providing the supplementary power. The charging circuit electrically connects to the supercapacitor set and is configured to electrically connect to the power board, wherein the charging circuit charges the supercapacitor set when the voltage detected value is larger than the baseline voltage value.

According to further another embodiment of this disclosure, the supercapacitor set further comprises a first supercapacitor, a second supercapacitor, and a switching unit. The first supercapacitor electrically connects to the charging circuit, wherein the first supercapacitor provides a first supplementary power when the voltage detected value is less than or equal to the baseline voltage value. The second supercapacitor electrically connects to the charging circuit, wherein the second supercapacitor provides a second supplementary power after the first supercapacitor provides the first supplementary power and the voltage detected value is less than or equal to the baseline voltage value. The switching unit electrically connects to the first supercapacitor and the second supercapacitor and configured to electrically connect to the electrical device through the power rail, wherein the switching unit selectively transmits at least one of the first supplementary power and the second supplementary power serving as the supplementary power provided by the supercapacitor set. The signal emitter further generates a device protection signal and is configured to send the device protection signal to the host when the supercapacitor set provides the second supplementary power.

According to an embodiment of this disclosure, a voltage adjustment method, comprising: obtaining a voltage detected value of a power rail by a voltage detector; sending a power good signal by a signal emitter when the voltage detected value is larger than a baseline voltage value for the first time; sending a voltage adjustment signal by the signal emitter according to the voltage detected value after the signal emitter sends the power good signal; and selectively adjusting a voltage of the power rail by a voltage converter of a power board according to the voltage adjustment signal.

According to another embodiment of this disclosure, the voltage adjustment method further comprises: after sending the power good signal by the signal emitter, providing a supplementary power by a supercapacitor set when the voltage detected value is less than or equal to the baseline voltage value.

The supercapacitor set in the above embodiment comprises a first supercapacitor and a second supercapacitor, and the supplementary power comprises a first supplementary power and a second supplementary power. According to further another embodiment of this disclosure, the voltage adjustment method further comprises: after providing the first supplementary power by the first supercapacitor, providing the second supplementary power by the second supercapacitor when the voltage detected value is less than or equal to the baseline voltage value. After sending the power good signal by the signal emitter, charging the first supercapacitor and the second supercapacitor by a charging circuit when the voltage detected value is larger than the baseline voltage value. After providing the first supplementary power by the first supercapacitor, sending a device protection signal by the signal emitter when the voltage detected value is less than or equal to the baseline voltage value. When charging the first supercapacitor and the second supercapacitor by the charging circuit, charges the second supercapacitor, and charges the first supercapacitor after the second supercapacitor is fully charged.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The present disclosure is adapted to the power rail end or a low-voltage part of the power rail in a server system or a storage system. In general, the power rail end means the trace that is further away from the power source than others. Usually, the longer the passing path is, the larger the voltage attenuation is. The voltage adjustment device and voltage adjustment method disclosed in the present disclosure will be described below in three embodiments.

Figure 1:
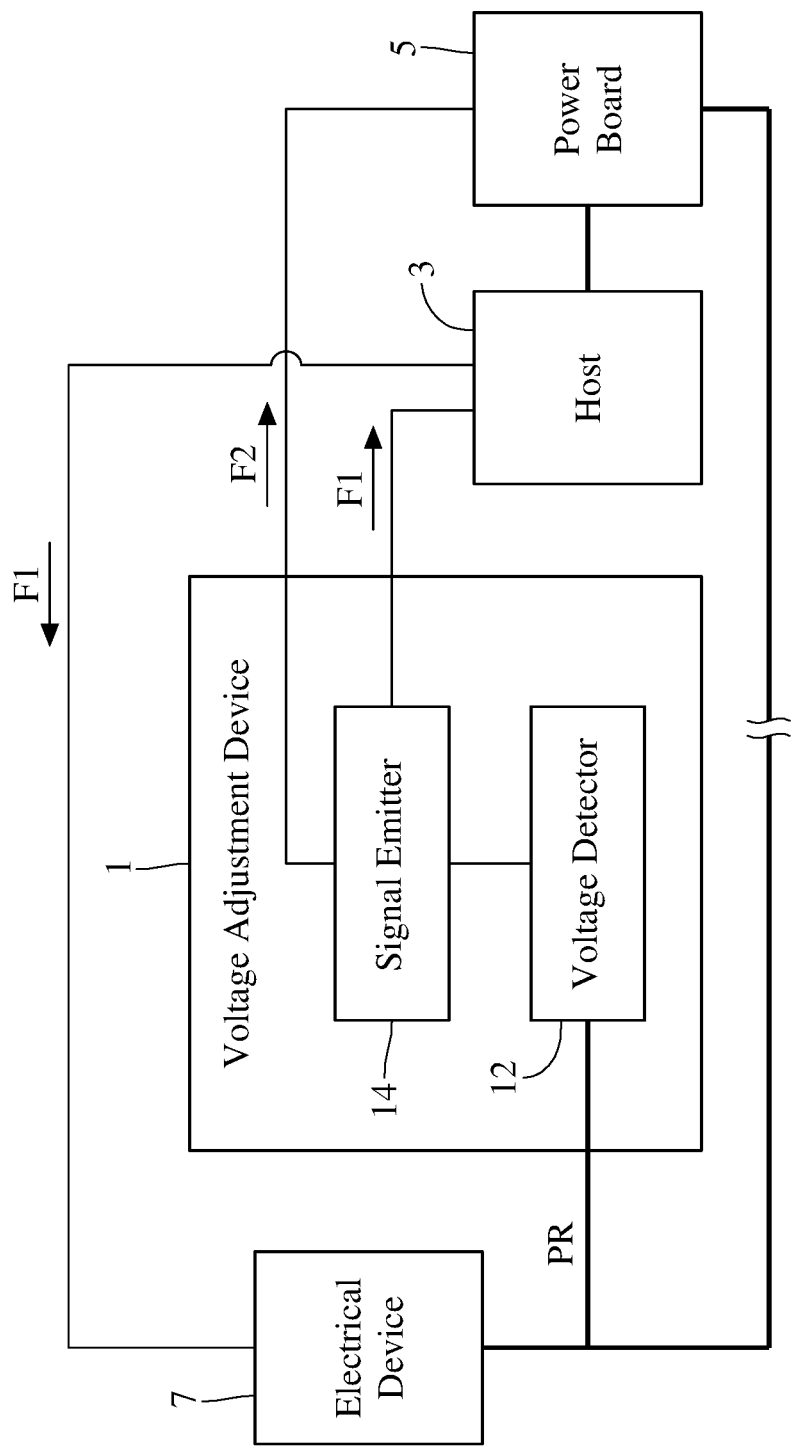
FIG. 1 is an architecture diagram of the voltage adjustment device and its application environment according to an embodiment of the present disclosure.

Please refer to FIG. 1, which illustrates an architecture diagram of the voltage adjustment device 1 and its application environment according to an embodiment of the present disclosure. As shown in FIG. 1, the voltage adjustment device 1 comprises a voltage detector 12 and a signal emitter 14. The voltage adjustment device 1 electrically connects to a host 3, a power board 5, and an electrical device 7, wherein the host 3 electrically connects to and controls the electrical device 7, the power board 5 electrically connects to the host 3 and the electrical device 7 to supply the operation power required by the host 3 and the electrical device 7. In practice, the electrical device 7 is, for example, a hard disk or a computing unit that cost a large amount of power. The present disclosure does not limit the hardware type of the electrical device 7.

The voltage detector 12 electrically connects to the electrical device 7 through a power rail to obtain a voltage detected value of the power rail. In practice, the power board 5 uses a voltage converter to convert an external power to different DC voltages and supplies these DC voltages to a plurality of electrical devices and their corresponding power rails in the system. The voltage detector 12 is preferably mounted at the end of the power rail or the portion that has a relatively high magnitude of voltage drop, such as the power rail illustrated in FIG. 1. In reality, a power simulation software is usually applied to find a relatively high voltage attenuation portion of the power rail as the actual mounted position in the system in advance, such position has the worst case of power supply in the system, so it can be a reference point for subsequent voltage adjustment.

The signal emitter 14 electrically connects to the voltage detector 12, the host 3 and the power board 5. When the voltage detected value is larger than the baseline voltage value for the first time, the signal emitter 14 generates a power good signal F1 and sends the power good signal F1 to the host 3. The host 3 can continue to activate the electrical device 7 after getting the power good signal F1. In general, the power good signal F1 is implemented by changing the power good pin from a low level to a high level to notify the host 3. The above-mentioned "being larger than the baseline voltage value for the first time" refers to a situation that the voltage value of the power rail reaches a voltage value (i.e., the baseline voltage value) for the first time after the system is started up, by which the electrical device 7 electrically connecting to the power rail may operate normally.

After sending the power good signal F1, the voltage detector 12 keeps detecting the voltage of the power rail, and the signal emitter 14 generates a voltage adjustment signal F2 according to voltage detected value and sends the voltage adjustment signal F2 to the power board 5 for selectively adjusting a voltage provided by the power board 5 in the meantime. Specifically, the signal emitter 14 feedbacks the voltage adjustment signal F2 to the voltage converter of the power board 5 for dynamic adjustment. For example, when the voltage of the power rail is too low, the voltage converter can boost the voltage according to the voltage adjustment signal F2. In practice, the voltage detected value obtained by the voltage detector 12 is divided into parts, one of the parts feeds back to the voltage control pin of the power board 5 to adjust the output voltage of the voltage converter.

Figure 2:
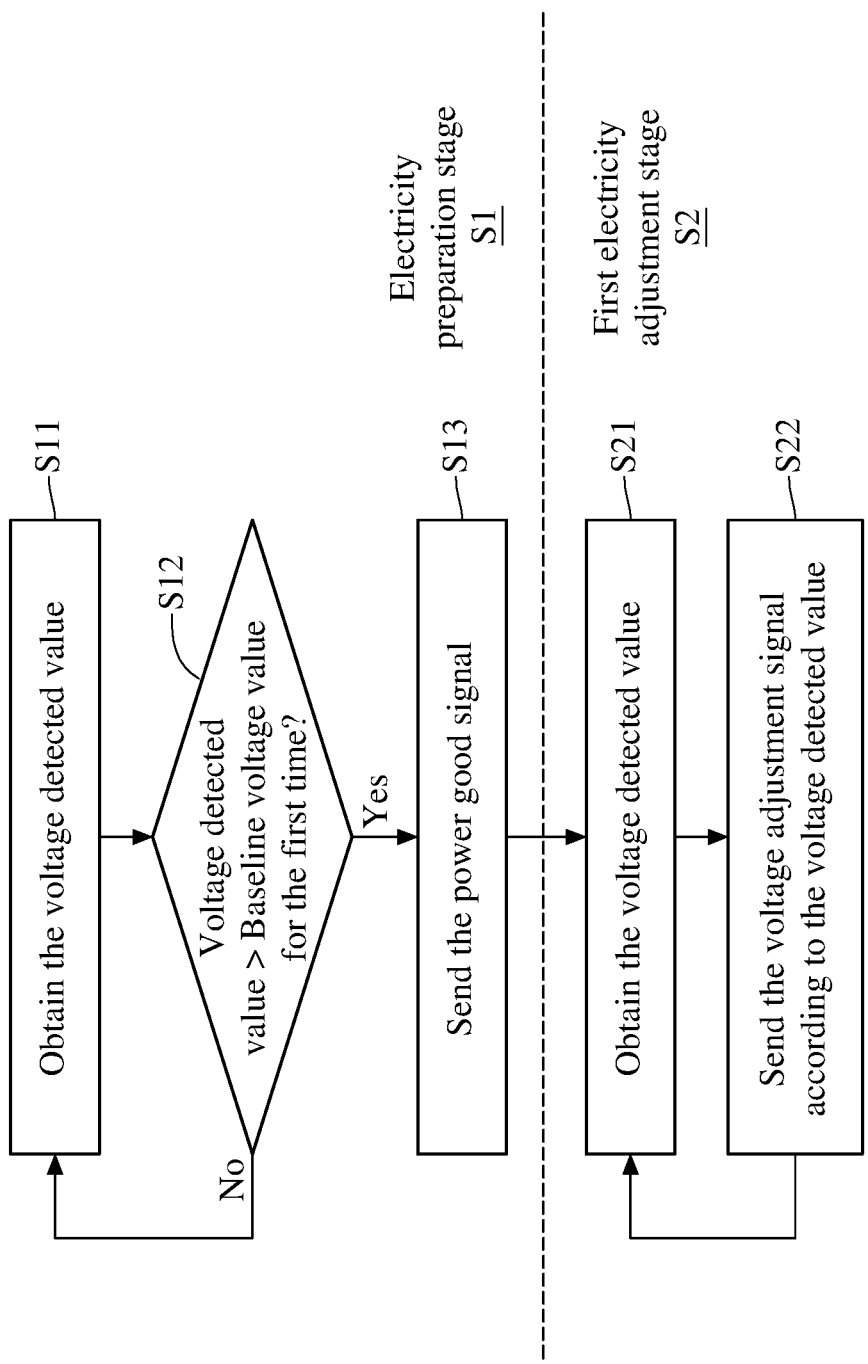
FIG. 2 is a flowchart of the voltage adjustment method according to an embodiment of the present disclosure.

Please refer to FIG. 2, which illustrates a flowchart of the voltage adjustment method according to an embodiment of the present disclosure, wherein the electricity preparation stage S1 includes steps S11-S13, and the first electricity adjustment stage S2 includes steps S21-S22.

Please refer to step S11, "obtaining the voltage detected value". Specifically, after mounting the voltage adjustment device 1 and powering on the power board 5 for activating the system, the voltage detector 12 obtains the voltage detected value of the power rail. Please refer to step S12, if it is the first time that the voltage detected value is larger than the baseline voltage value, step S13 is performed, wherein the signal emitter 14 sends the power good signal F1 to the host 3. On the other hand, if the voltage detected value is less than or equal to the baseline voltage value, namely the voltage of the power rail has not reached a stable state, it returns to step S11. Please refer to step S21 and step S22. After the signal emitter 14 sends the power good signal F1, the voltage detector 12 keeps obtaining the voltage detected value, meanwhile, the signal emitter 14 sends the voltage adjustment signal F2 according to the present voltage detected value, and the voltage converter of the power board 5 selectively adjusts the supplied voltage of the power rail according to the voltage adjustment signal F2. Compared to other power rails in the system, the power rail is usually slower to react to the voltage increase. Therefore, when the voltage of the power rail is confirmed reaching the baseline voltage value in step S12, voltages on other power rails in the system should have reached this baseline voltage value simultaneously or earlier. Problems such as transient leakage or chip abnormality caused by an inconsistent power-on sequence in large systems can be avoided consequently. In addition, the voltage adjustment device 1 still dynamically adjusts the supplied voltage of the power board 5 according to the present voltage detected value of the power rail during step S21 and step S22, instead of increasing a fixed amount of voltage from the power source thus leading to an excessive voltage of the front-end power rail. As a result, voltage adjustment device 1 and the voltage adjustment method according to the embodiment of the present disclosure can promise the stability and the accuracy of the power supply of the power rail.

Figure 3:
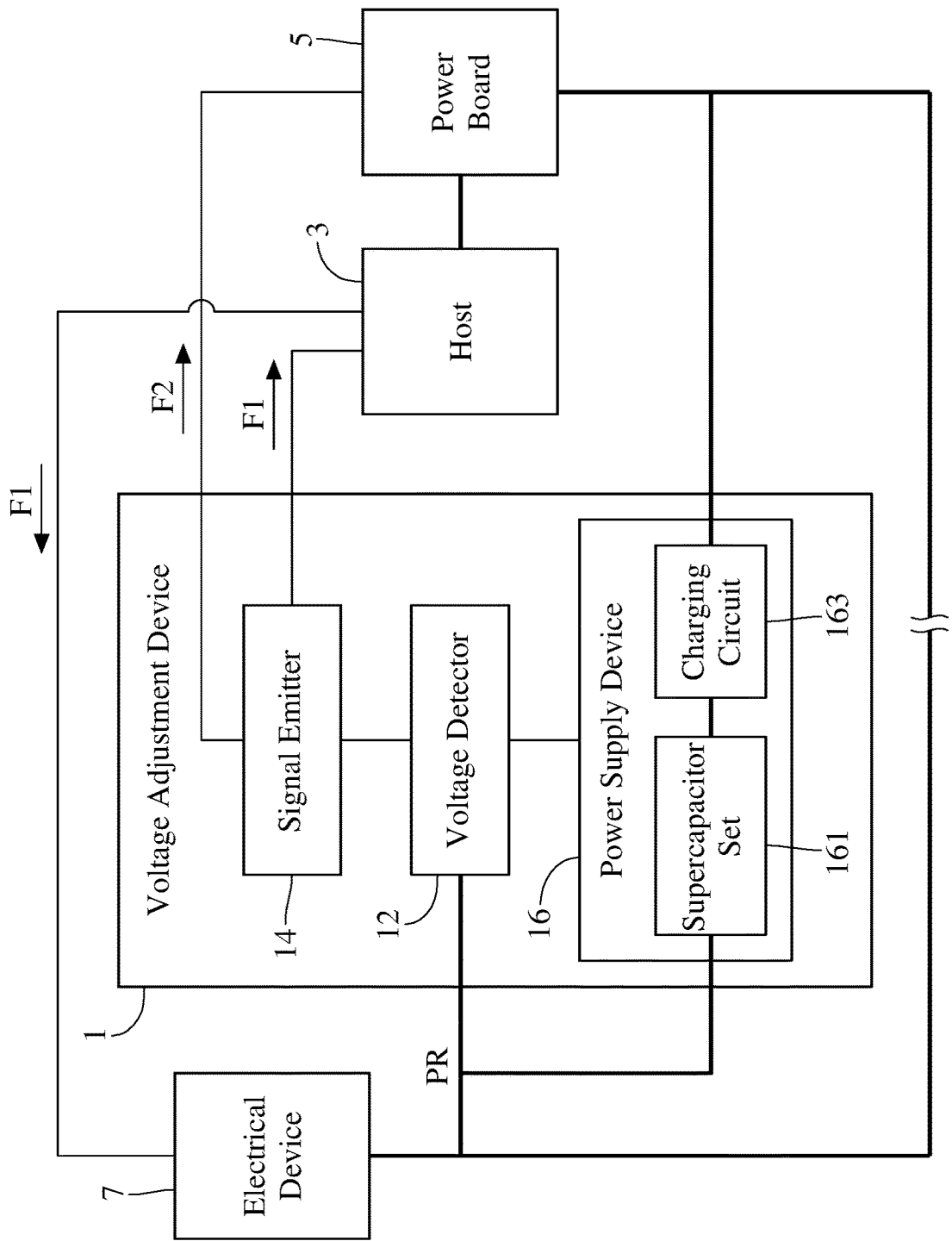
FIG. 3 is an architecture diagram of the voltage adjustment device and its application environment according to another embodiment of the present disclosure.

Please refer to FIG. 3, which illustrates an architecture diagram of the voltage adjustment device and its application environment according to another embodiment of the present disclosure. Said another embodiment further comprises a power supply 16 based on the foregoing embodiment. The power supply device 16 electrically connects to the voltage detector 12 and electrically connects to the electrical device 7 through the power rail and electrically connects to the power board 5. The power supply device 16 provides the supplementary power when the voltage detected value is less than or equal to the baseline voltage value.

Specifically, the power supply device 16 comprises the supercapacitor set 161 and the charging circuit 163. The supercapacitor set 161 electrically connects to the electrical device 7 through the power rail to provide the supplementary power. The supercapacitor set 161 comprises one or more supercapacitors. Said supercapacitor is an EDLC (Electrostatic Double-Layer Capacitors) whose advantages are fast charging and discharging speed, large current, and fast reaction speed. In practice, the arrangement of supercapacitor set 161 should be considered based on the system power consumption and the available placing space.

In system level points of view, the supplied voltage of the power board 5 cannot increase unlimitedly, otherwise, the front-end power rail (i.e., the power rail near the power supply and the voltage loss is relatively light) may have an excessive voltage state. Therefore, when the voltage of the power rail drops so drastically as to be lower than the baseline voltage value and the voltage adjustment made by the voltage converter cannot offset the voltage drop, the voltage adjusting device 1 of another embodiment of the present disclosure immediately release the supplementary power stored in the supercapacitor set 161 for compensating the electrical device 7 as soon as possible.

It should be particularly noted herein that the application of the supercapacitor set 161 in said another embodiment of the present disclosure is different from the common application. In general, the supercapacitor is usually used to provide additional backup power to prevent data loss due to power loss when the system is out of power. However, the design of said another embodiment of the present disclosure enables the supercapacitor set 161 to perform dynamic voltage compensation as long as the voltage detector 12 detects that the voltage drop reaches a certain degree (i.e., the voltage detected value is less than or equal to the baseline voltage value).

Please refer to FIG. 3. The charging circuit 163 electrically connects to the supercapacitor set 161 and the power board 5. The charging circuit 163 charges the supercapacitor set 161 when the voltage detected value is larger than the baseline voltage value. In other words, the previous power consumption of the supercapacitor set 161 recovers by the charging circuit 163 when system loading is not heavy (no severe voltage drop condition).

In practice, the power supply device 16 may further comprise a switching unit. The switching unit electrically connects to the voltage detector 12. The switching unit selectively connects or disconnects the supercapacitor in the supercapacitor set 161 to the charging circuit according to whether the voltage detected value is larger than the baseline voltage value. Specifically, the switching unit connects the trace between the charging circuit 163 and the supercapacitor for charging when the voltage detected value is larger than the baseline voltage value. Alternatively, the switching unit disconnects the trace between the charging circuit 163 and supercapacitor when the supercapacitor is fully charged.

Figure 4:
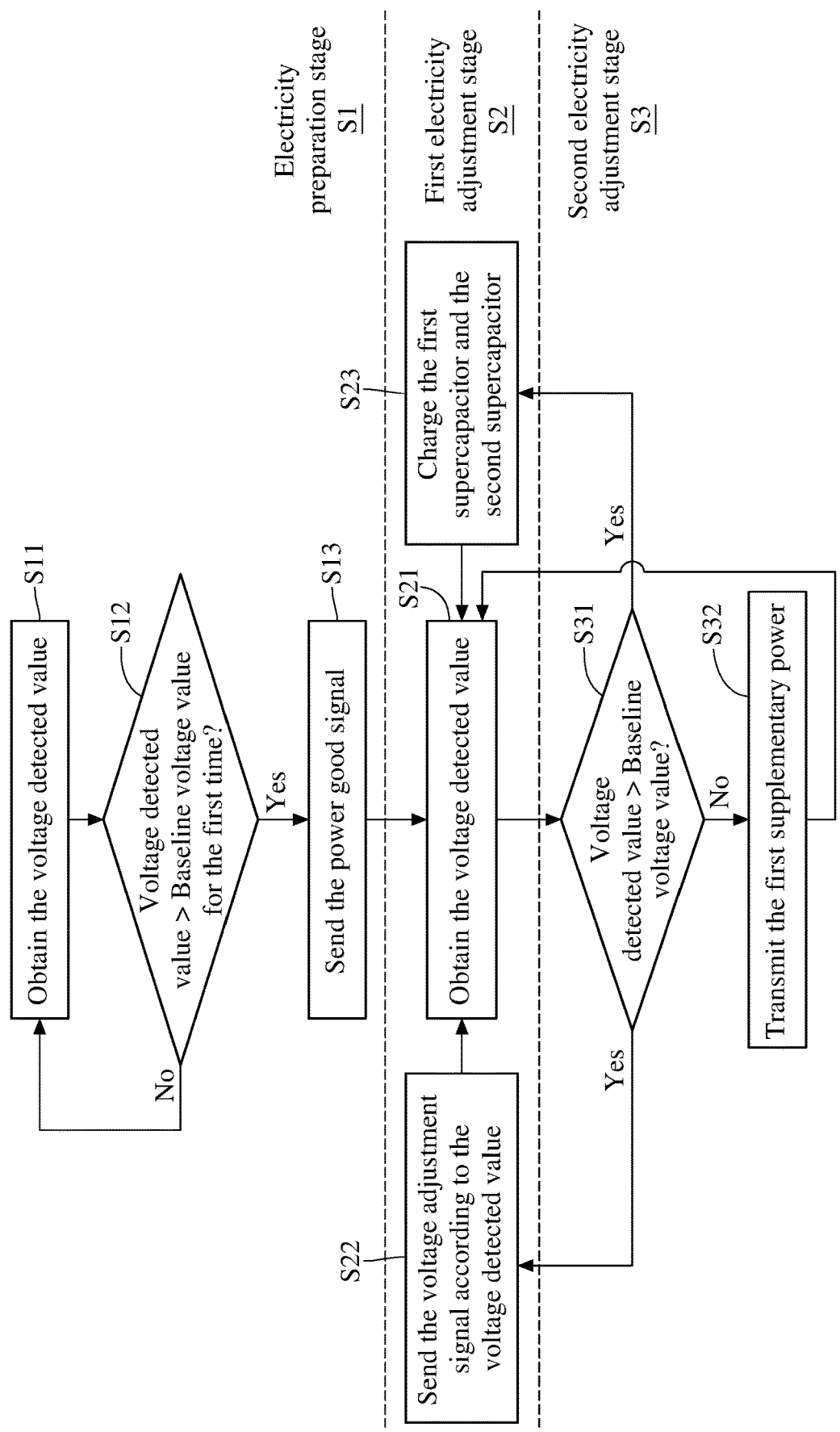
FIG. 4 is a flowchart of the voltage adjustment method according to another embodiment of the present disclosure.

Please refer to FIG. 4, which illustrates a flowchart of the voltage adjustment method according to another embodiment of the present disclosure, wherein steps S11-S13 in FIG. 4 represent the electricity preparation stage S1 like FIG. 1. Based on the previous embodiment, said another embodiment further comprises additional steps related to voltage adjustment mainly performed by the power supply device 16, which are a step S23 in the first electricity adjustment stage S2 and a second electricity adjustment stage S3.

Please refer to step S21. After the signal emitter 14 sends the power good signal F1, the voltage detector 12 still keeps detecting the power rail to obtain the voltage detected value, and step S31 is performed. When the voltage detected value is less than or equal to the baseline voltage value, meaning that using the voltage adjustment signal F2 cannot avoid the voltage drop of the power rail in the first electricity adjustment stage S2, step S32 is thus performed, enabling the supercapacitor set 161 in the power supply device 16 for providing the supplementary power. On the other hand, if the voltage detected value is larger than the baseline voltage value, the signal emitter 14 sends the voltage adjustment signal F2 according to the voltage detected value, like step S22 described in previous embodiment. Meanwhile, please refer to step S23, the power supply device 16 charges the supercapacitor set 161. After step S23 is performed, the voltage adjustment method returns to step S21 for the voltage detection.

In addition, in the voltage adjustment method shown in FIG. 4, after "the voltage detected value is larger than the baseline voltage value" is confirmed in step S12, in addition to performing step S13 to send the power good signal F1, step S23 can also be performed immediately to charge the supercapacitor without waiting for step S31 to reconfirm that the voltage detected value is larger than the baseline voltage value. In other words, in another embodiment of the present disclosure, step S23 can be alternatively performed after step S13 or after S31 depending on the practical demand.

As described above, the voltage adjustment device 1 and the voltage adjustment method according to said another embodiment of the present disclosure not only preserve the effect described in the previous embodiment but also add the power supply device 16 and associated enabling step thereof. The voltage compensation is performed instantaneously when the voltage adjustment signal F2 cannot effectively increase the voltage of the power rail. Therefore, data loss caused by the low voltage at the power rail and its connected electrical device 7 can be effectively avoided.

Figure 5:
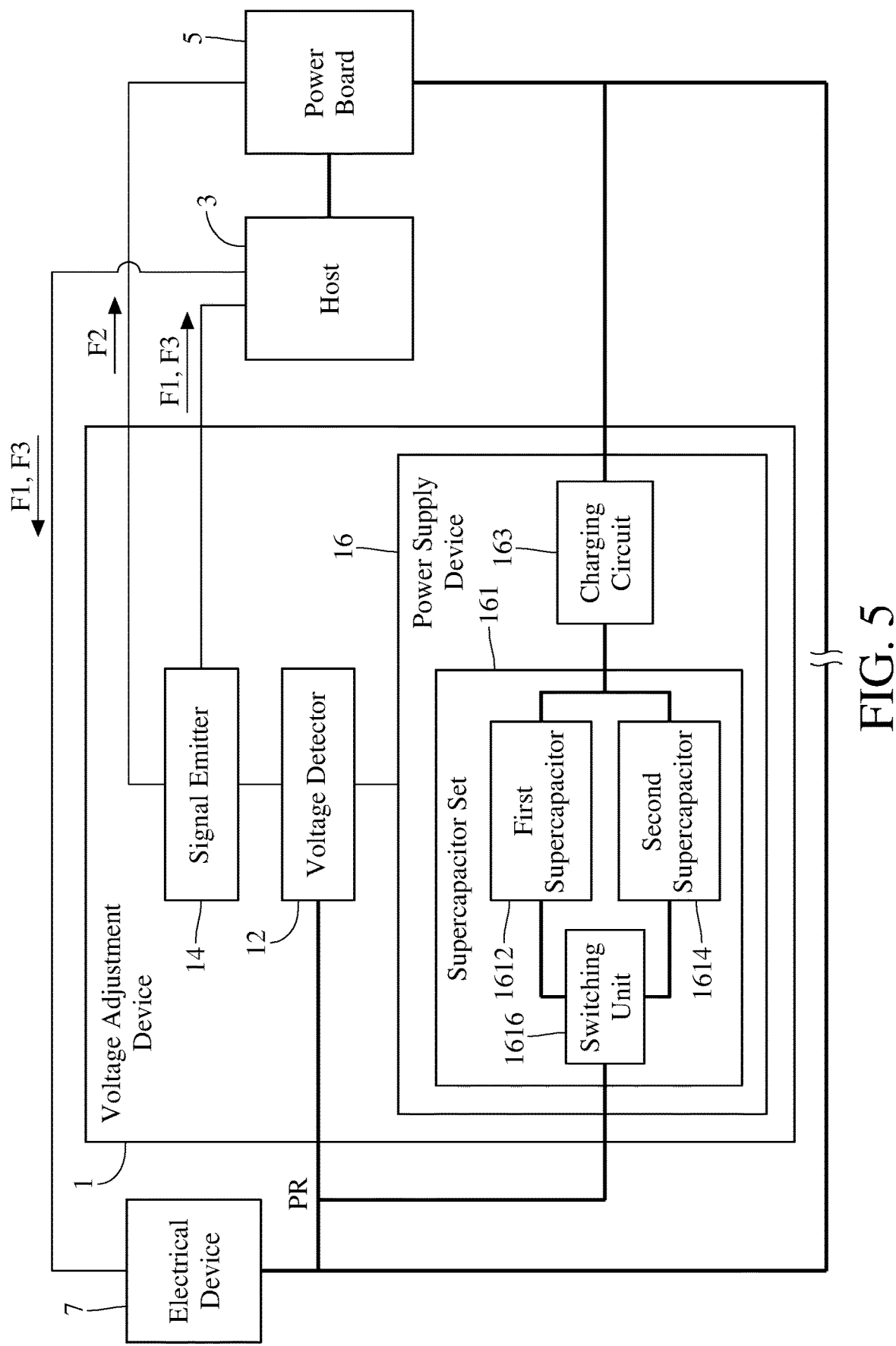
FIG. 5 is an architecture diagram of the voltage adjustment device and its application environment according to further another embodiment of the present disclosure.

Please refer to FIG. 5, which illustrates an architecture diagram of the voltage adjustment device 1 and its application environment according to further another embodiment of the present disclosure. Said further another embodiment improves the power supply device 16 and the signal emitter 14 based on the previous embodiment. Specifically, the supercapacitor set 161 described in said another embodiment comprises the first supercapacitor 1612, the second supercapacitor 1614 and the switching unit 1616 in said further another embodiment, and the supplementary power described in another embodiment comprises the first supplementary power and the second supplementary power in said further embodiment. The first supercapacitor 1612 and second supercapacitor 1614 electrically connect to the charging circuit 163 as shown in FIG. 5. The first supercapacitor 1612 provides the first supplementary power when the voltage detected value is less than or equal to the baseline voltage value. The second supercapacitor 1614 provides the second supplementary power while the voltage detected value is less than or equal to baseline voltage value after the first supercapacitor 1612 has provided the first supplementary power. The switching unit 1616 electrically connects first supercapacitor 1612 and the second supercapacitor 1614 and electrically connects to electrical device 7 through the power rail. The switching unit 1616 selectively transmits at least one of the first supplementary power and the second supplementary power. The signal emitter 14 further sends a device protection signal F3 to the host 3 when providing the second supplementary power. The host 3 performs a data protection procedure to the corresponding electrical device 7 after getting the device protection signal F3. In practice, when the voltage drop time is too long or the drop degree is too large, it means that the first supercapacitor 1612 has been or is about to run out of power. At this time, the voltage adjustment device 1 according to said further another embodiment of the present disclosure enables the second supercapacitor 1614 for voltage compensation, thereby extending the time of voltage drop. At the same time, the voltage adjustment device 1 uses the signal emitter 14 to send the device protection signal F3 to the host 3, so the host 3 may perform a data protection procedure in advance and turn off the electrical device 7 having insufficient voltage on the power rail.

In practice, in the system, there is a plurality of power rails PR that have serious voltage drop conditions need to install the voltage adjustment devices 1 described according to said further another embodiment of the present disclosure. Therefore, the voltage detector 12 and the power supply device 16 can be modularized respectively, then the voltage detector 12 and the power supply device 16 are respectively installed at different power rails. The signal emitter 14 receives the voltage detected values obtained from the plurality of voltage detectors 12 and transmits the power good signal F1 after all the voltage detected values reach their baseline voltage values respectively. As for the voltage adjustment signals F2 and the device protection signals F3 corresponding to each of power rails, it depends on the baseline voltage value of each power rail to determine whether to send the above signals or not. However, the above descriptions are merely illustrative and are not intended to limit the specific application of said further another embodiment of the present disclosure.

Figure 6:
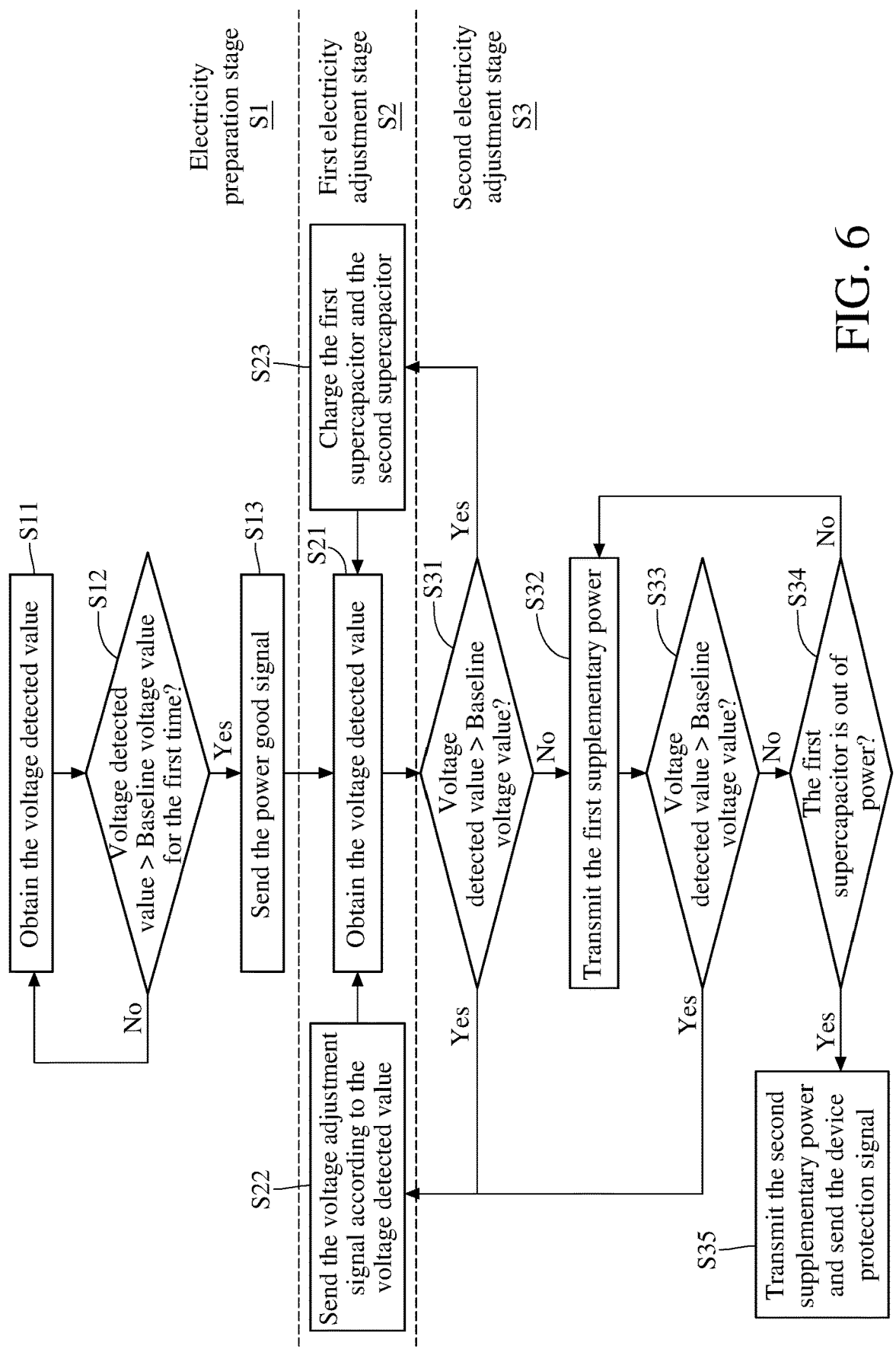
FIG. 6 is a flowchart of the voltage adjustment method according to further another embodiment of the present disclosure.

Please refer to FIG. 6, which illustrates a flowchart of the voltage adjustment method according to said further another embodiment of the present disclosure, wherein the electricity preparation stage S1 represented by steps S11-S13 in FIG. 6 is identical to that in FIG. 1 and FIG. 4, and the first electricity adjustment stage S2 represented by steps S21-S23 in FIG. 6 is identical to that in FIG. 4. Please refer to FIG. 7, which illustrates a voltage-time diagram of a voltage adjustment example, wherein the baseline voltage value is 12 volts. Hereinafter, a voltage adjustment method according to further another embodiment of the present disclosure will be described with reference to FIG. 6 and FIG. 7.

Please refer to step S11 in FIG. 6, "obtaining the voltage detected value". Step 11 corresponds to a time interval between 0 ms and 0.5 ms in FIG. 7. In this time interval, the voltage detected value keeps rising but not beyond the baseline voltage value, 12 volts.

Please refer to step S12 in FIG. 6, judging whether the voltage detected value is larger than the baseline voltage value for the first time. Since the judging result of step S12 is "Yes" at the mark point P12 as shown in FIG. 7, step S13 is performed to send the power good signal F1, which means that the progress enters the first electricity adjustment stage S2 from the electricity preparation stage S1.

Figure 7:
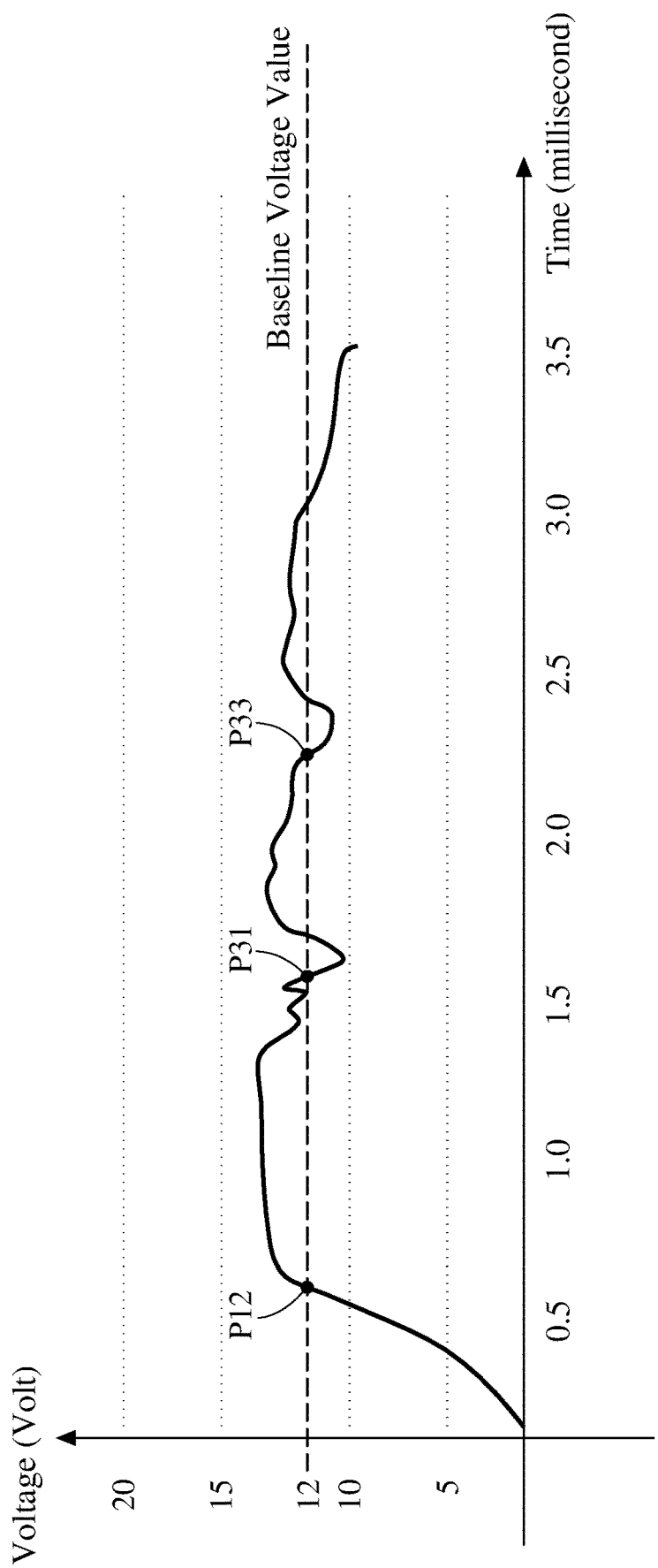
FIG. 7 is a voltage-time diagram of a voltage adjustment example.

Please refer to step S21 and step S31 in FIG. 6, obtaining the voltage detected value and judging whether the voltage detected value is larger than the baseline voltage value, wherein step S21 and step S31 correspond to a time interval between 0.5 ms and 1.5 ms in FIG. 7. Please refer to the voltage adjustment example as shown in FIG. 7. Since the voltage detected value keeps being larger than the baseline voltage value in this time interval, step S22, "sending the voltage adjustment signal F2 according to the voltage detected value" by the signal emitter 14, and step S23, "charging the first supercapacitor 1612 and the second supercapacitor 1614 of the charging circuit 163", are performed after step S31. In practice, step S23 can be scheduled to start after step S13, so that the charging circuit 163 may charge the first supercapacitor 1612 and the second supercapacitor 1614 early. In addition, the charging circuit 163 charges the second supercapacitor 1614 firstly and then charges the first supercapacitor 1612 after the second supercapacitor 1614 is fully charged. This charging order ensures that the first supercapacitor 1612 is out of power when the second supercapacitor 1614 is discharging. From another perspective, this charging order can avoid the situation that the second supercapacitor 1614 starts to charge when the voltage detected value returns to the baseline voltage value due to the discharge of the first supercapacitor 1612. However, the present disclosure does not limit to this charging order. In practice, the charging policy of "concurrent charging" policy or "charging first supercapacitor 1612 first" policy can be adopted depending on the requirement.

Please refer to step S32, "providing the first supplementary power", in FIG. 6, and also refer to the mark point P31 in FIG. 7. After about 1.5 milliseconds after booting, although the voltage of the power rail is raised by the voltage adjustment signal F2 in the first electricity adjustment stage S2, the voltage detected value gradually reduces to less than or equal to the baseline voltage value, that is, the judging result of the mark point P31 in step S31 is "No". Here, the voltage adjustment method according to further another embodiment of the present disclosure enters the second electricity adjustment stage S3 and provides the first supplementary power by enabling the first supercapacitor 1612, together with the voltage adjustment signal F2 for improving the voltage of the power rail.

After about 1.5 milliseconds after the power-on, although the voltage of the line PR is raised by the voltage adjustment signal F2 in the first power adjustment phase S2, the voltage detected value is gradually reduced to less than or equal to the baseline voltage value, that is, the judgment result of the marker point P31 in step S31 is "NO".

Please refer to the curve between 1.5 ms and 2.0 ms as shown in FIG. 7. After the first supercapacitor 1612 provides the first supplementary power, the voltage detected value rises above the baseline voltage value, which reflects the effect of the first supplementary power. Therefore, the judging result of step S33 is "Yes" in FIG. 6, the progress returns to step S22 in the first electricity adjustment stage S2 and the power board 5 dynamically adjusts the output voltage according to the voltage adjustment signal F2.

It should be noticed that: every time when the progress returns to the first electricity adjustment stage S2, the voltage detected value is larger than the baseline voltage value; at this time, the first supercapacitor 1612 stops discharging. In practice, the switching unit 1616 further comprises an anti-overdischarge circuit. The anti-overdischarge circuit calculates the present electric quantity of the supercapacitor 1612, 1614, and cuts off the discharge path when the supercapacitor 1612, 1614 are about to run out of power, thereby preventing the supercapacitor 1612, 1614 from damage because of overdischarge.

Please refer to FIG. 7. The voltage detected value goes down again at the time point of about 2.0 ms, and the voltage detected value is less than or equal to the baseline voltage value at the mark point P33. The above situation is equivalent to step S33 in FIG. 6 whose judging result is "No", so the progress moves to step S34, judging whether the first supercapacitor 1612 has available electricity. In practice, the voltage drop may happen because the system load increases in a short time, or because the external power supply connected to the power board 5 is unstable, or because the trace between the power board 5 and the power rail has an abnormal condition. The first supplementary power will run out when the voltage fall time lasts too long or the voltage drops too much. Therefore, the judging result in step S34 thus is "Yes". The voltage adjustment method according to further another embodiment of the present disclosure performs step S35 to provide the second supplementary power and send the device protection signal F3. Specifically, the power output source of the switching unit 1616 changes from the first supercapacitor 1612 to the second supercapacitor 1614, thereby compensating the voltage and delaying the voltage drop. Please refer to the time interval between 2.5 ms and 3.0 ms in FIG. 7. The voltage detected value rises again, reflecting the effect of the second supplementary power. However, when the second supercapacitor 1614 needs to provide the second supplementary power, it means that the condition of voltage drop at the power rail is severe. At this time, the device protection needs to be performed immediately to prevent data loss due to a power failure at any time, so the signal emitter 14 of the voltage adjustment device 1 according to further another embodiment of the present disclosure sends the device protection signal F3 to notify the host 3. Please refer to FIG. 7, because of the buffer time extended by the power supply from the second supercapacitor 1614, the host 3 can store the data and turn off the electrical device 7 whose voltage is insufficient before the time point of 3.0 ms, thereby avoiding the data loss problem could happen on electrical device 7 of the power rail because of voltage drop.

To sum up, the present disclosure proposes a voltage adjustment device and a voltage adjustment method that can keep off problems such as voltage drop or timing disorder generated at the end of the power rail, and increase the reliability of the power supply. In addition, the present disclosure may also respond instantly and has sufficient buffer time to ensure that the data is not lost when an extremely serious voltage drop occurs. Further, the present disclosure can also reduce the limitation of system circuit design due to voltage drop. On the other hand, compared to the conventional system whose voltage adjustment is performed with a fixed input voltage after finishing the adjusting operation, in the above embodiments of the present disclosure, the feedback signal is sent from the place whose voltage drops most in the system, then a dynamic power supply optimized adjustment is performed, which effectively solves the problem that the front-end power rail has excessive voltage. On the aspect of supercapacitor's application, unlike the general application that uses the supercapacitor as the backup power source, the above embodiment of the present disclosure performs the voltage compensation by the quick response characteristic of a supercapacitor and ensures the stability and the reliability of the power supply of the whole system. In the application of the supercapacitor, unlike the general application method of using the supercapacitor as the backup power source, the above embodiment of the present invention compensates the voltage by the fast response of the supercapacitor and ensures the stability and reliability of the power supply in the system. Overall, the present disclosure finds the place where the voltage drop is the most serious, sets the place as a reference point of the feedback signal, and installs the voltage adjustment device described in the above embodiments, wherein the supercapacitors are included to comprehensively solve the problem such as voltage level drop, timing disorder caused by factors such as abnormal power rails/connectors, and load loss. Furthermore, the voltage adjustment method according to the above embodiments of the present disclosure can ensure that there is enough buffer time to store the data when the abnormal situation happens, thereby avoiding the data loss due to the power failure of power loss.

What is claimed is:

1. A voltage adjustment device configured to electrically connect to a host in a system, a power board, and an electrical device, wherein the host electrically connects to and controls the electrical device, and the power board electrically connects to the host and the electrical device to supply operation power required by the host and the electrical device, with the voltage adjustment device comprising:
- a voltage detector configured to electrically connect to the electrical device through an end of a power rail of an end of the system and obtain a voltage detected value of the end of the power rail; and
- a signal emitter electrically connecting to the voltage detector and configured to electrically connect to the host and the power board, wherein, when the voltage detected value is larger than a baseline voltage value for the first time, the signal emitter generates a power good signal and is configured to send the power good signal to the host, and, after sending the power good signal, the signal emitter generates a voltage adjustment signal according to the voltage detected value and is configured to send the voltage adjustment signal to the power board for selectively adjusting a voltage provided by the power board.

2. The voltage adjustment device according to claim 1, further comprising:
- a power supply device electrically connecting to the voltage detector, configured to electrically connect to the electrical device through the end of the power rail, and configured to electrically connect to the power board, wherein the power supply device provides a supplementary power when the voltage detected value is less than or equal to the baseline voltage value.

3. The voltage adjustment device according to claim 2, wherein the power supply device comprises:
- a supercapacitor set configured to electrically connect to the electrical device through the end of the power rail for providing the supplementary power; and
- a charging circuit electrically connecting to the supercapacitor set and configured to electrically connect to the power board, wherein the charging circuit charges the supercapacitor set when the voltage detected value is larger than the baseline voltage value.

4. The voltage adjustment device according to claim 3, wherein the supercapacitor set further comprises:
- a first supercapacitor electrically connecting to the charging circuit, wherein the first supercapacitor provides a first supplementary power when the voltage detected value is less than or equal to the baseline voltage value;
- a second supercapacitor electrically connecting to the charging circuit, wherein the second supercapacitor provides a second supplementary power after the first supercapacitor provides the first supplementary power and the voltage detected value is less than or equal to the baseline voltage value; and
- a switching unit electrically connecting to the first supercapacitor and the second supercapacitor and configured to electrically connect to the electrical device through the end of the power rail, wherein the switching unit selectively transmits at least one of the first supplementary power and the second supplementary power serving as the supplementary power provided by the supercapacitor set;

wherein the signal emitter further generates a device protection signal and is configured to send the device protection signal to the host when the supercapacitor set provides the second supplementary power.

5. A voltage adjustment method, comprising:
- obtaining a voltage detected value of an end of a power rail disposed at an end of a system by a voltage detector;
- sending a power good signal by a signal emitter when the voltage detected value is larger than a baseline voltage value for the first time;
- sending a voltage adjustment signal by the signal emitter according to the voltage detected value after the signal emitter sends the power good signal; and
- selectively adjusting a voltage of the end of the power rail by a voltage converter of a power board according to the voltage adjustment signal.

6. The voltage adjustment method according to claim 5 further comprising:
- after sending the power good signal by the signal emitter, providing a supplementary power by a supercapacitor set when the voltage detected value is less than or equal to the baseline voltage value.

7. The voltage adjustment method according to claim 6, wherein the supercapacitor set comprises a first supercapacitor and a second supercapacitor, and the supplementary power comprises a first supplementary power and a second supplementary power, the voltage adjustment method further comprising:
- after providing the first supplementary power by the first supercapacitor, providing the second supplementary power by the second supercapacitor when the voltage detected value is less than or equal to the baseline voltage value.

8. The voltage adjustment method according to claim 7 further comprising:
- after sending the power good signal by the signal emitter, charging the first supercapacitor and the second supercapacitor by a charging circuit when the voltage detected value is larger than the baseline voltage value.

9. The voltage adjustment method according to claim 8, wherein charging the first supercapacitor and the second supercapacitor by the charging circuit comprises charging the second supercapacitor and charging the first supercapacitor after the second supercapacitor is fully charged.

10. The voltage adjustment method according to claim 7 further comprising:
- after providing the first supplementary power by the first supercapacitor, sending a device protection signal by the signal emitter when the voltage detected value is less than or equal to the baseline voltage value.

* * * * *